(12) United States Patent
Luehrs

(10) Patent No.: US 7,263,899 B2
(45) Date of Patent: Sep. 4, 2007

(54) DEVICE FOR TRANSPORTING BULK MATERIAL AND DOSING AND/OR MIXING SYSTEM PROVIDED WITH ONE SUCH DEVICE

(76) Inventor: Friedrich Luehrs, Am Langen Lande 4, 49453 Rehden/Lohaus (DE)

( * ) Notice: Subject to any disclaimer, the term of this patent is extended or adjusted under 35 U.S.C. 154(b) by 0 days.

(21) Appl. No.: 10/542,083

(22) PCT Filed: Jan. 15, 2004

(86) PCT No.: PCT/DE2004/000073

§ 371 (c)(1),
(2), (4) Date: Mar. 16, 2006

(87) PCT Pub. No.: WO2004/065265

PCT Pub. Date: Aug. 5, 2004

(65) Prior Publication Data

US 2006/0225516 A1 Oct. 12, 2006

(30) Foreign Application Priority Data

Jan. 16, 2003 (DE) .................. 103 01 359

(51) Int. Cl.
G01F 1/84 (2006.01)
(52) U.S. Cl. .................................. 73/861.355
(58) Field of Classification Search ........... 73/861.355, 73/861.351, 861.354, 831.357
See application file for complete search history.

(56) References Cited

U.S. PATENT DOCUMENTS

| | | | |
|---|---|---|---|
| 4,805,462 A | 2/1989 | Labschies | |
| 5,121,638 A | 6/1992 | Gmuer | |
| 5,353,647 A | 10/1994 | Toerner | |
| 5,686,671 A | 11/1997 | Nelson et al. | |
| 5,782,201 A | 7/1998 | Wells | |
| 6,412,355 B1* | 7/2002 | Haberli et al. | 73/861.356 |
| 6,484,591 B2* | 11/2002 | Drahm et al. | 73/861.355 |
| 6,860,158 B2* | 3/2005 | Bitto et al. | 73/861.355 |
| 6,920,798 B2* | 7/2005 | Wenger et al. | 73/861.355 |
| 6,957,587 B2* | 10/2005 | Bitto et al. | 73/861.355 |

FOREIGN PATENT DOCUMENTS

| | | |
|---|---|---|
| AT | 384147 B | 10/1987 |
| DE | 37 38 156 A1 | 10/1988 |
| EP | 0 292 723 A2 | 11/1988 |
| EP | 0 431 525 | 6/1991 |
| EP | 0 590 187 | 4/1994 |
| GB | 2 345 344 A | 7/2000 |

* cited by examiner

*Primary Examiner*—Jewel Thompson
(74) *Attorney, Agent, or Firm*—Michael J. Striker

(57) ABSTRACT

What is described is a device for conveying bulk goods, particularly in the form of a continuous conveyor and here in particular in the form of a chain conveyor. According to the invention, the conveying device has a measuring apparatus (7) for determining the delivery rate of transported goods. Furthermore, according to the invention, a dosing apparatus (5) and/or a mixing apparatus is provided, which is equipped with at least one conveying device of this type. It is thereby possible to mix precisely dosed quantities of additives into the bulk goods, for example dry feed, or to mix together a plurality of different bulk goods, for example, different types of dry feed in precise mixing ratios (FIG. 1).

27 Claims, 2 Drawing Sheets

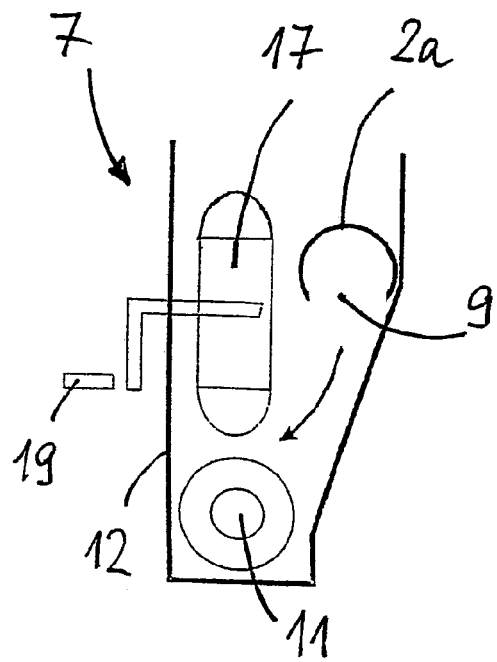
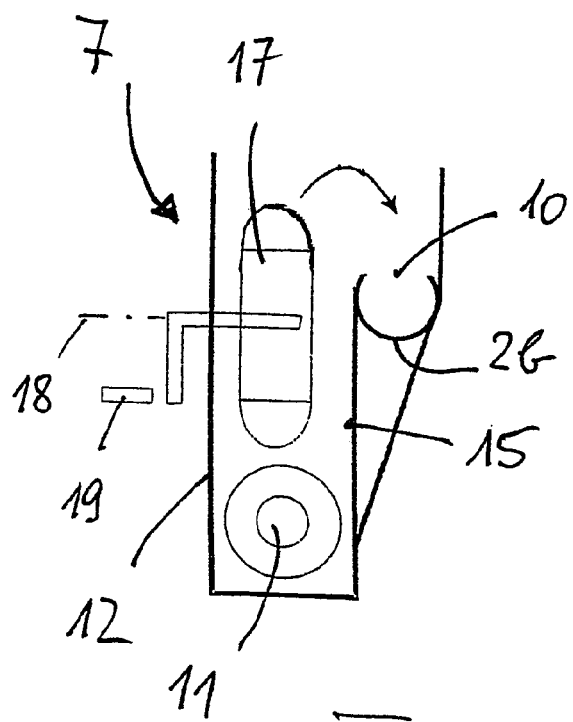
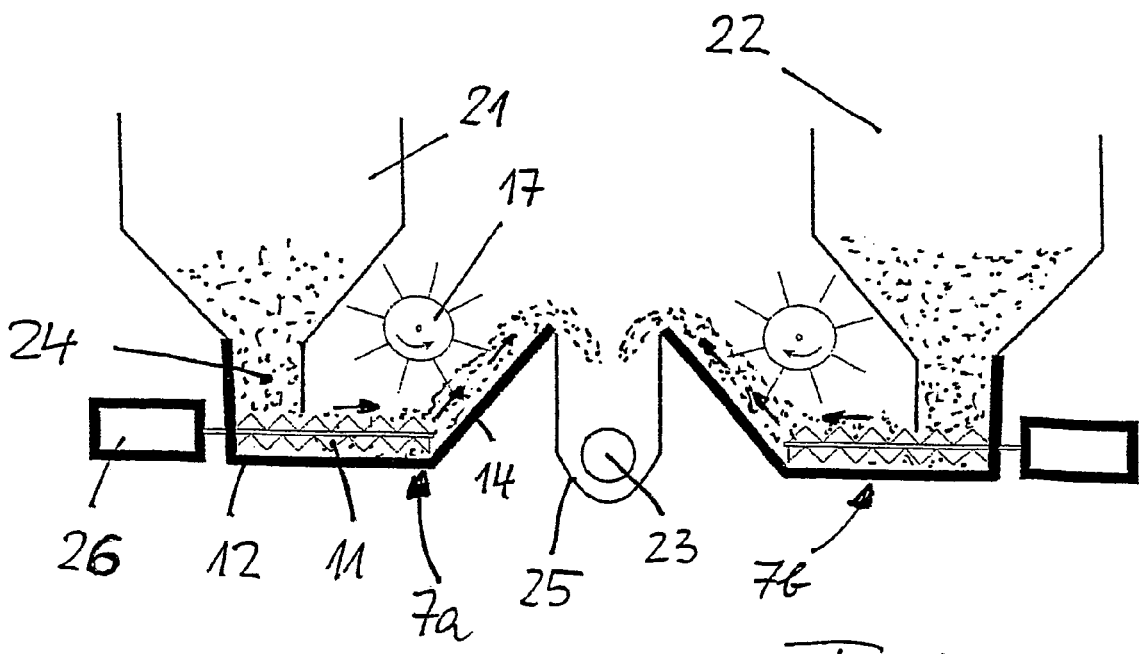

DEVICE FOR TRANSPORTING BULK MATERIAL AND DOSING AND/OR MIXING SYSTEM PROVIDED WITH ONE SUCH DEVICE

The invention relates to a device for conveying bulk goods and to dosing and/or mixing apparatus equipped therewith.

The dosing of additives into bulk goods that are transported with conveying devices has previously only been possible with sufficient accuracy if the bulk goods are conveyed at a known, constant rate (weight per unit time). This precondition is often lacking.

In livestock sheds, it is usual, for example, to feed dried feed in the form of meal, pellets or the like to a plurality of feeding sites and to enrich the bulk goods with additives such as vitamins, minerals or the like in at least one dosing apparatus. However, the dosing apparatus is merely switched on or off depending on whether the conveying device conveys feed or not. Variations in the conveying rate, such as can occur when the bulk goods are transferred unevenly from a storage container to the conveying apparatus are not taken into account in these dosing devices and therefore influence the dosing accuracy. Prevention of this disadvantage is not possible when using conventional conveying devices which usually comprise continuous conveyors and particularly chain conveyors.

A further dosing problem frequently arises when the wish exists to mix bulk goods, such as different types of dry feed, conveyed by a plurality of conveying devices in a precise quantity ratio. For this purpose also, it was previously necessary that the quantities of bulk goods fed in by the conveying devices were not subject to variations over time.

It is therefore an object of the invention to design a conveying device for bulk goods of the type concerned here such that precise dosing and/or mixing of bulk goods, as required, is possible independently of whether the conveying output of the conveying devices involved is constant or subject to variation.

The fulfillment of this aim is provided primarily by the conveying device according to claim 1. A conveying device designed in this manner provides the conditions for achieving precise dosing and/or mixing of bulk goods. According to the invention, a dosing and/or mixing apparatus is also equipped with a conveying device of this type, as disclosed by the features of claims 22 and 27. By this means, on the one hand, dosing is possible whereby the quantities of additives added may be adjusted to the quantity of bulk goods fed in by the conveying device such that, even given variations in the conveying output or in the quantities of bulk goods or dry feed supplied by the dosing apparatus, a high level of dosing accuracy or a precise volume and/or weight ratio of the bulk goods to the additives may be maintained. On the other hand, with two or more conveying devices according to the invention, bulk goods mixtures may be made with mixing ratios that are largely independent of variations in the respective conveying outputs.

Further advantageous features are disclosed in the dependent claims.

Exemplary embodiments of the invention will now be described with reference to the accompanying drawings, in which:

FIGS. 2 and 3 show schematic sections along the lines II-II and III-III of FIG. 1; and FIG. 4 shows a schematic section through a mixing apparatus containing two conveying devices according to the invention.

Figure 1:
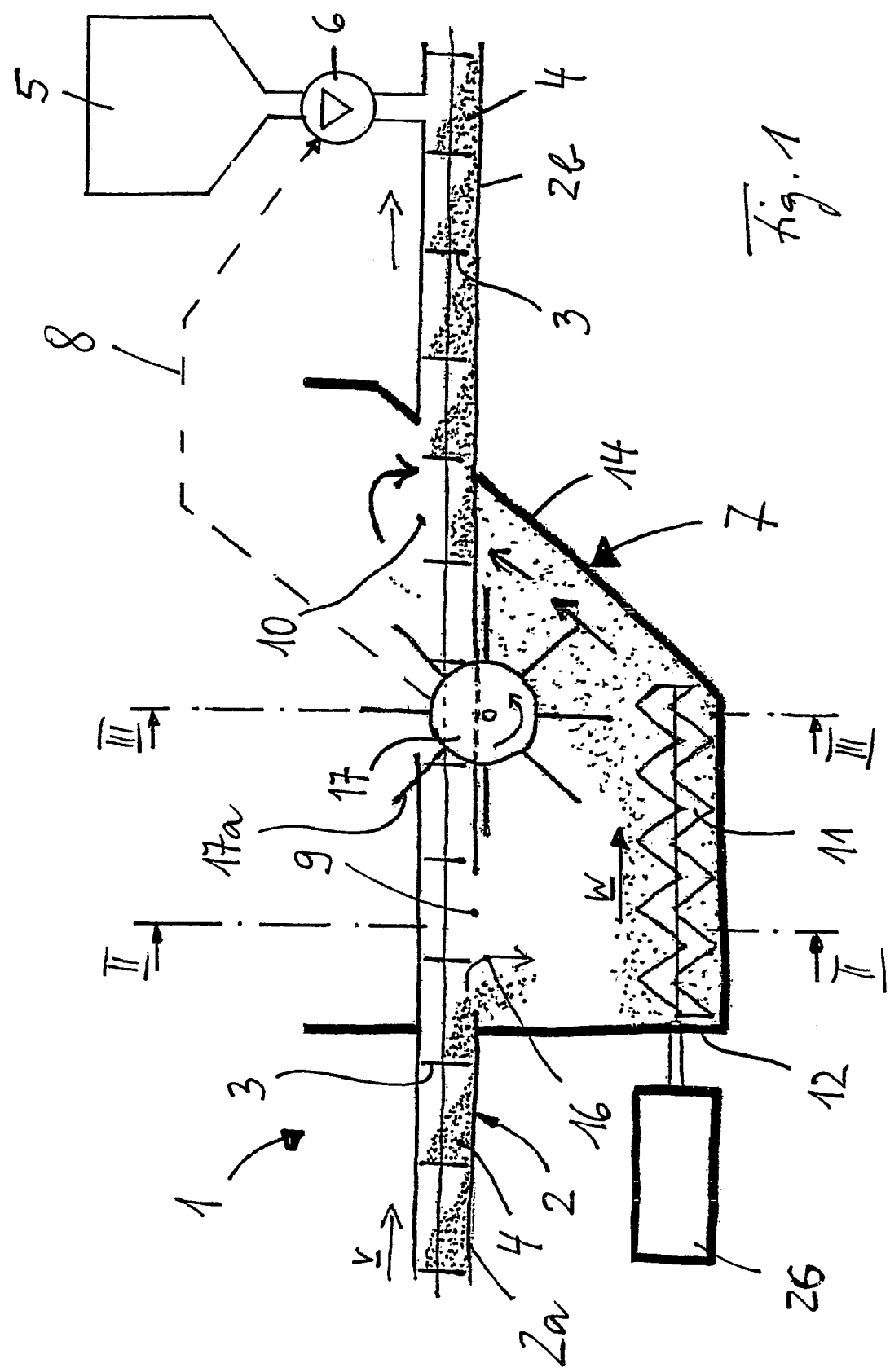
FIG. 1 shows a schematic longitudinal section through a bulk goods conveying device with dosing apparatus attached.

FIGS. 1 to 3 show a conveying device 1 in a rough schematic form. In the embodiment shown, this comprises a continuously operating conveyer in the form of a chain conveyer which, as the transport means, has at least one chain (not shown) moved in the direction of the arrows v, which is guided in an enclosed tube from which issues a conveyor 2. The usual type of pushers 3 are attached to the chain at predetermined separations, between which schematically indicated bulk goods 4 are arranged and are pushed along by the chain and the pushers 3 in the direction of the arrow v. In the embodiment, the conveying device 1 is a typical chain conveyor, as is often to be found particularly in cattle or pig sheds, whilst the bulk goods 4 are present as dry food in the form of cereal grains, coarse soya meal, fine feed meal or the like with grain sizes of up to, for example, 10 mm. The conveyor 2 normally extends to at least one feeding site or the like and may pass a dosing apparatus 5 in particular, by means of which an additive (not shown) may be added to the bulk goods stream flowing past. Dosing is carried out with a typical discharge unit 6, which is connected via a pipe section to an upper opening of the tube comprising the conveyor 2.

According to the invention, the quantity of additives fed in by the dosing apparatus 5 may be adjusted to the momentary delivery rate of the conveying device 1 such that, even when its conveying output varies, the desired dosing accuracy is maintained.

For this purpose, the conveyor 2 is divided at a predetermined site and provided with delivery apparatus and receiving apparatus for the bulk goods 3. Arranged between the delivery apparatus and the receiving apparatus is a measuring apparatus 7, by means of which the transported quantity of bulk goods 4 may be measured. It is thus possible, as indicated in FIG. 1 by a line 8, to control the discharge unit 6 depending on the measured delivery rate.

The measuring apparatus 7 is set up so that it removes at least a partial stream of the bulk goods 3 transported by the conveyor 2 from said conveyor, determines a variable corresponding to the bulk goods quantity transported in this partial stream, and then feeds the partial stream back to the conveyor 2.

In this embodiment, the delivery apparatus comprises a lower opening 9 in the tube defining the conveyor 2, as shown particularly in FIG. 2. This opening 9 comprises, together with a section 2a of the conveyor 2 lying in front of it in the conveying direction (arrow v), a delivery apparatus by means of which bulk goods 4 fed in are at least partially transferred into the measuring apparatus 7. The return of this bulk goods stream out of the measuring apparatus 7 to the conveyor 2 takes place at another site situated further downstream in the conveying direction by means of a further, in this case upwardly situated, opening 10 in the tube comprising the conveyor 2, as shown in particular by FIG. 3. This second opening 10, together with a section 2b of the conveyor 2 lying behind it in the conveying direction, comprises a receiving apparatus for the quantity of bulk goods diverted at the opening 9 and transferred into the measuring apparatus.

The measuring apparatus 7 has an intermediate conveyor 11 arranged between the two openings 9 and 10, which is preferably designed as a screw conveyor. Particularly advantageously, the measuring apparatus 7 is accommodated in a container or trough 12 arranged beneath a selected section of the conveyor 2 and is enclosed on all sides by side walls and a base, apart from an upwardly open upper side.

The opening 9 is preferably arranged sufficiently far above the base of the container 12 and the intermediate conveyor 11, which is provided on the base. The bulk goods 4 are thus removed from the delivery apparatus by gravity or by formation of an incline out of the conveyor 2, such that it is taken up by the end of the intermediate conveyor 11 at the rear in the conveying direction and can be transported through the container 12 in the direction of an arrow w parallel to the arrow v.

The measuring apparatus 7 also has a gradient path 14 behind the intermediate conveyor 11 in the conveying direction (arrow w) which is formed, for example, by an upward sloping floor section of the container 12 and leads from the end of the intermediate conveyor 11 at the front in the conveying direction towards the opening 10. This is separated, as FIG. 3 in particular shows, by an intermediate wall 15 from a portion of the container 12 provided with the intermediate conveyor 11 and the gradient path 14. Therefore, the arrangement is made such that the portion of the bulk goods 4 which is diverted in the direction of an arrow 16 out of the conveyor 2 passes under gravity to the intermediate conveyor 11 and is transported further by said intermediate conveyor and is pushed upwards along the gradient path 14 until it passes, in the manner of an overflow, over the upper edge of the intermediate wall 15 and through the opening 10 back to the conveyor 2 in order to be taken up by the pushers 3 in said conveyor and further transported.

Preferably at a site lying forwardly in the conveying direction between the end of the intermediate conveyor 11 and the opening 10, the measuring device 7 has a measuring element 17 interacting with the partial stream, which serves to determine the bulk goods quantity conveyed in the partial stream. Preferably, the measuring element 17 is constructed as a measuring wheel provided with shovels 17a or the like or an otherwise suitably profiled measuring wheel, which is borne in the container 12 easily rotatable about a rotation axis 18 which runs substantially horizontally and perpendicular to the conveying direction. The measuring wheel 17 and its shovels 17a are formed and arranged such that the measuring wheel 17 is driven or caused to rotate by the partial stream with a circumferential speed or rotation rate that is proportional to the quantity of bulk goods in the partial stream or the volume of bulk goods conveyed in the partial stream per unit time.

The discharge unit 6 of the dosing apparatus 5 may have as a dosing organ, for instance, a rotatable pump wheel or the like conveying the respective additive. If this pump wheel is mechanically coupled to the measuring wheel 17, it may be driven directly by the measuring apparatus and with a rotary speed which corresponds to the momentary delivery rate in the diverted partial stream. Thus, precise additive dosing is possible even given variations in this delivery rate. A gearbox adjustable in steps or steplessly may also be connected between the measuring wheel 17 and the discharge unit 6, in order to be able to preselect individually the quantity ratio between the bulk goods and the additives.

Alternatively, the discharge unit 6 may be under the control of the measuring apparatus 7 by other means. It might be possible, for example, to provide the measuring wheel 17 at the beginning with magnetic north and/or south poles whose passage at a predetermined site is sensed by a suitable inductive sensor 19 (FIGS. 2 and 3) and converted into electrical impulses, which are then fed via the line 8 in FIG. 1 to an electric circuit and have a pulse repetition frequency that is proportional to the bulk goods quantity flowing in the diverted partial stream. From a signal derived therefrom, a dosing organ may be controlled, which in this case may be a slider which is closable to a greater or lesser extent.

FIG. 4 shows a second embodiment of the invention. The material to be brought to a feeding site in this case comprises a mixture of at least two bulk goods of different types, which are each held stored in a silo or supply container 21 or 22 and are fed into a mixing container in a predetermined mixing ratio or are fed to some conveyor unit 23 leading to a feeding site. In this case, the supply containers 21, 22 each represent a bulk goods dispensing apparatus and the conveying units 23 each represent a bulk goods receiving apparatus of the overall conveying device.

As FIG. 4 shows, a measuring apparatus 7a or 7b constructed similarly to that in FIGS. 1 to 3 is situated between the supply containers 21, 22 and the conveying unit 23. Each measuring apparatus 7a, 7b thus has a container 12 with an intermediate conveyor 11 arranged on its base, a gradient path 14 and a measuring element 17. The entrance to the measuring apparatus 7 here is a lower opening 24 of the supply container 21 or 22, whilst the output of the measuring apparatus 7 is an overflow arranged at the end of the gradient path 14, over which the bulk goods pushed upwardly by the intermediate conveyor 11 on the gradient path 14 falls onto the conveying unit 23 or a channel 25 or the like surrounding said conveying unit.

A first difference between the embodiments described consists therein that in the embodiment according to FIGS. 1 to 3, the delivery and receiving apparatus are the supplying and removing parts of a chain conveyor or the like which is interrupted by the measuring apparatus 7, whilst in the embodiment according to FIG. 4, the bulk goods are conveyed out of a supply container 21, 22 and into the measuring apparatus 7 purely by gravity and out of said measuring apparatus by means of the intermediate conveyor 11 into a receiving apparatus, which may be a stationary container.

There is also a difference in function, since in the embodiment according to FIGS. 1 to 3, the measuring element 17 controls a dosing organ in order thereby to add measured quantities of additives to a stream of bulk goods, whereas in the embodiment according to FIG. 4, mixing ratios can also be easily created in that preselected quantities of different bulk goods are placed in a stationary container. Mixing then takes place in that, for example, preselected quantities of bulk goods measured with the measuring apparatus 7a, 7b are fed to the receiving apparatus 23, 25 and the measuring elements 17 serve the purpose, for example, of shutting closing elements arranged in the outlet openings 24 of the respective supply containers 21, 22 as soon as a preselected quantity of bulk goods has been transferred into the receiving apparatus 23, 25.

An alternative, particularly to the last described embodiment consists not in opening or shutting a closing element of the associated supply container 21, 22 more or less with the aid of the measuring element 17, but of controlling a drive motor 26 for the associated intermediate conveyor 11. In this regard, the possibility exists once of switching the drive motor 26 on or off when, for the purpose of mixing, only a predetermined quantity of bulk goods is to be conveyed into the receiving apparatus 23, 25. If, by contrast, the aim exists of conveying a predetermined quantity of bulk goods in a predetermined time, then the measuring signal from the measuring apparatus 7a, 7b may also be used to control the drive motor 26 via an electronic (microprocessor) control system or the like such that the intermediate conveyor 11 is driven faster or slower as required, and that thereby more or less bulk goods are transported in a particular time span out of the relevant supply container 21, 22 into the receiving apparatus 23, 25.

It is also clear that the present invention contains both a dosing apparatus (FIG. 1) under the control of the measuring apparatus according to the invention, as well as a mixing apparatus (FIG. 4) by means of which, bulk goods taken from at least two supply containers 21, 22 are brought together in measured quantities in a common container, conveying element or the like and then exist there in predetermined weight ratios to one another.

The invention is not restricted to the described embodiments, which may be adapted in many different ways. For instance, it would be possible in FIGS. 1 to 3 to provide two mutually independent conveying systems separated by the measuring apparatus 7, of which one comprises the bulk goods delivery apparatus and the other comprises the bulk goods receiving apparatus. The variant shown in FIG. 1 has the advantage, however, that the conveyor 2 which is in any event continuous, need only be provided at the required sites with the openings 9 and 10 in order that the measuring apparatus 7 may also be subsequently built into an already installed conveying device. It is also apparent from FIGS. 2 and 3 that the intermediate conveyor 11 which, for example, is driven by the schematically illustrated drive motor 26 lies substantially vertically beneath the measuring element 18, whilst the parts of the conveyor 2 having the openings 9 and 10 are arranged laterally offset to the measuring element 17. It is apparent, however, that numerous other embodiments of the measuring apparatus 7 or of the container 12 are possible. In addition, the measuring wheel may be designed differently from the illustration and replaced by other measuring elements 17. Furthermore, it is apparent from the arrangement according to FIG. 4 that the entire bulk goods stream drawn from one of the supply containers 21, 22 is guided via the measuring apparatus 7 and the intermediate conveyor 11, whereas in the arrangement according to FIGS. 1 to 3, it could also be ensured that only part of the bulk goods stream flowing along the conveyor 2 reaches the measuring apparatus 7, whilst the remainder of the bulk goods stream is transported further along the conveyor 2 and then is reunited with the diverted partial stream in the region of the opening 10. A subdivision of this type is more or less inevitable on use of chain conveyors, since a small amount of the bulk goods always remains caught in the chains or pusher elements 3 and therefore does not reach the measuring apparatus 7. However, it may be assumed that the diverted partial stream stands in a fixed ratio to the whole bulk goods stream and therefore measurement of the partial stream alone leads to an accurate determination of the quantity of the overall stream flowing through the conveying device. It should also be understood that the features described may also be used in other combinations than those illustrated and described.

The invention claimed is:

1. Device for conveying bulk goods (4) having a bulk goods delivery apparatus and a bulk goods receiving apparatus, characterised by a measuring apparatus (7, 7a, 7b) arranged between the receiving apparatus and the delivery apparatus in order to determine the delivery rate.

2. Device according to claim 1, characterised in that it has a first section (2a) comprising the delivery apparatus and, following said delivery apparatus in the conveying direction, a second section (2b) comprising the receiving apparatus.

3. Device according to claim 1, characterised in that it has a supply container (21, 22) comprising the delivery apparatus.

4. Device according to claim 3, characterised in that it has a mixing container comprising the receiving apparatus.

5. Device according to claim 3, characterised in that the receiving apparatus is designed as a conveying apparatus (2b, 23).

6. Device according to claim 1, characterised in that the measuring apparatus (7, 7a, 7b) has an inlet section linked to the delivery apparatus, an output section linked to the receiving apparatus and an intermediate conveyor (11) arranged between the two sections.

7. Device according to claim 1, characterised in that the transfer of the bulk goods (4) from the delivery apparatus to the measuring apparatus (7, 7a, 7b) takes place under gravity.

8. Device according to claim 1, characterised in that the transfer of the bulk goods from the measuring apparatus (7, 7a, 7b) into the receiving apparatus takes place by means of the intermediate conveyor (11) and along a gradient path (14).

9. Device according to claim 1, characterised in that the measuring apparatus (7, 7a, 7b) contains a measuring element (17) for cooperation with the bulk goods (4) flowing through it.

10. Device according to claim 9, characterised in that the measuring element (17) is a measuring wheel which can be induced to rotate by the bulk goods stream.

11. Device according to claim 10, characterised in that the measuring wheel is set up to generate electrical pulses.

12. Device according to claim 9, characterised in that the measuring element (17) is arranged between the intermediate conveyor (11) and the output section.

13. Device according to claim 1, characterised in that it is designed as a continuous conveyor.

14. Device according to claim 13, characterised in that it is designed as a chain conveyor.

15. Device according to claim 6, characterised in that the intermediate conveyor (11) is designed as a screw conveyor.

16. Device according to claim 9, characterised in that the intermediate conveyor (11) and the measuring element (17) are arranged in a trough (12) provided with the inlet section and the output section.

17. Device according to claim 16, characterised in that the gradient path comprises a base section of the trough (12), said base section being arranged inclined.

18. Device according to claim 1, characterised in that it is linked to at least one dosing apparatus (5) having a discharge unit (6) and the discharge unit (6) is under the control of the measuring apparatus (7, 7a, 7b).

19. Device according to claim 18, characterised in that the dosing apparatus (5) contains a dosing organ driven by the measuring wheel.

20. Device according to claim 19, characterised in that an adjustable gearbox is connected between the measuring wheel and the dosing organ.

21. Device according to claim 18, characterised in that the dosing apparatus (5) has an electrical control circuit for the discharge unit (6), said control circuit processing the electrical impulses.

22. Dosing apparatus with a discharge unit for dosed feeding of additives into a bulk goods stream generated by means of a conveying device (1), characterised in that the discharge unit (6) is controlled by a measuring apparatus (7, 7a, 7b) measuring the delivery rate of the conveying device (1).

23. Dosing apparatus according to claim 22, characterised in that the conveying device (1) is designed according to claim 1.

24. Dosing apparatus according to claim 22, characterised in that it contains a dosing organ driven by the measuring wheel.

25. Dosing apparatus according to claim 24, characterised in that an adjustable gearbox is arranged between the measuring wheel and the dosing organ.

26. Dosing apparatus according to claim 22, characterised in that it has an electrical control circuit for the discharge unit, said control circuit processing the electrical impulses.

27. Mixing apparatus for bulk goods (4) having at least two conveying devices leading to a common receiving apparatus (23, 25) for feeding in different bulk goods, whereby each conveying device is designed according to claim 1.

* * * * *